April 4, 1961

M. C. LUTTON 2,978,612

MODULARIZED RADIO RECEIVER

Filed July 27, 1956

4 Sheets-Sheet 1

INVENTOR.

Melvin C. Lutton

BY

Donald P. Smith

Attorney

April 4, 1961 M. C. LUTTON 2,978,612

MODULARIZED RADIO RECEIVER

Filed July 27, 1956

4 Sheets-Sheet 2

INVENTOR.
Melvin C. Lutton

BY
Donald P. Smith
Attorney

April 4, 1961 M. C. LUTTON 2,978,612

MODULARIZED RADIO RECEIVER

Filed July 27, 1956 4 Sheets-Sheet 3

INVENTOR.
Melvin C. Lutton
BY Donald P. Smith
Attorney

April 4, 1961

M. C. LUTTON 2,978,612

MODULARIZED RADIO RECEIVER

Filed July 27, 1956

4 Sheets-Sheet 4

INVENTOR.
Melvin C. Lutton
BY
Donald P. Smith
Attorney 2,978,612

MODULARIZED RADIO RECEIVER

Melvin C. Lutton, Silver Spring, Md., assignor, by mesne assignments, to Illinois Tool Works, Chicago, Ill., a corporation of Illinois Filed July 27, 1956, Ser. No. 600,583

6 Claims. (Cl. 317—101)

This invention relates to circuits and more particularly to radio receivers and the manufacture thereof.

In the manufacture of radio receivers and the like it is difficult to satisfy the condition of cheap mass production together with adaptability to circuit changes. Modern production lines which utilize to a great extent automatic machinery produce a circuit at low cost and with a relatively high degree of accuracy, however if it be necessary to change the circuit in any wise it is then a relatively expensive process to recycle the machines so that the redesigned circuit is produced.

Circuit construction today utilizes the printed circuitry techniques substantially to the exclusion of all other methods. The usual process of forming an electronic circuit is to provide a flat panel made of an insulating material and having disposed thereon a circuit array in a desired manner; the circuit conductors comprising metal paths ending at enlarged terminal areas at selected positions on the panel to be connected to electrical component leads. In this manner the discharge tube sockets are mounted by clamping, for example, through the panel at selected positions whereby the socket terminals engage the metal areas and paths. The same procedure is followed with transformers and variable condenser units, in a receiver. The smaller elements such as resistors, condensers and small inductors are usually mounted by providing small apertures through the insulating panel and passing the terminal leads through the apertures to be bent against the metal paths and soldered.

The invention disclosed herein illustrates a solution to the problem of mounting the smaller component elements of an electronic circuit whereby they are completely assembled as a sub-assembly and connected into a printed circuit panel as a unit. Summarily stated, the invention consists of providing in an electronic circuit a plurality of unitary structures each consisting of a group of electrically related circuit elements mounted on spaced planar insulating members with an array of metal paths on the members connecting to selected ones of the elements, and an assemblage of straight conductors piercing the members at their edges and connected to the paths, the conductors serving to penetrate a printed circuit panel and connect with the panel conductors. The invention will be explained as it applies to a radio receiver.

It is accordingly a broad object of this invention to provide a novel sub-assembly for a circuit.

It is a further object of the invention to provide an improved receiver structure in which the process of manufacture is greatly simplified, the performance of the circuit is improved, wiring of the receiver is facilitated and the receiver chassis is made very compact.

A still further object of this invention is the provision of a complete sub-assembly for a circuit which includes the resistors and capacitors employed in one of more of the circuit stages which may be readily and cheaply installed in a printed circuit panel.

Further objects and advantages of the invention will become apparent from the following description and claims and from the accompanying drawings wherein:

Figure 1:
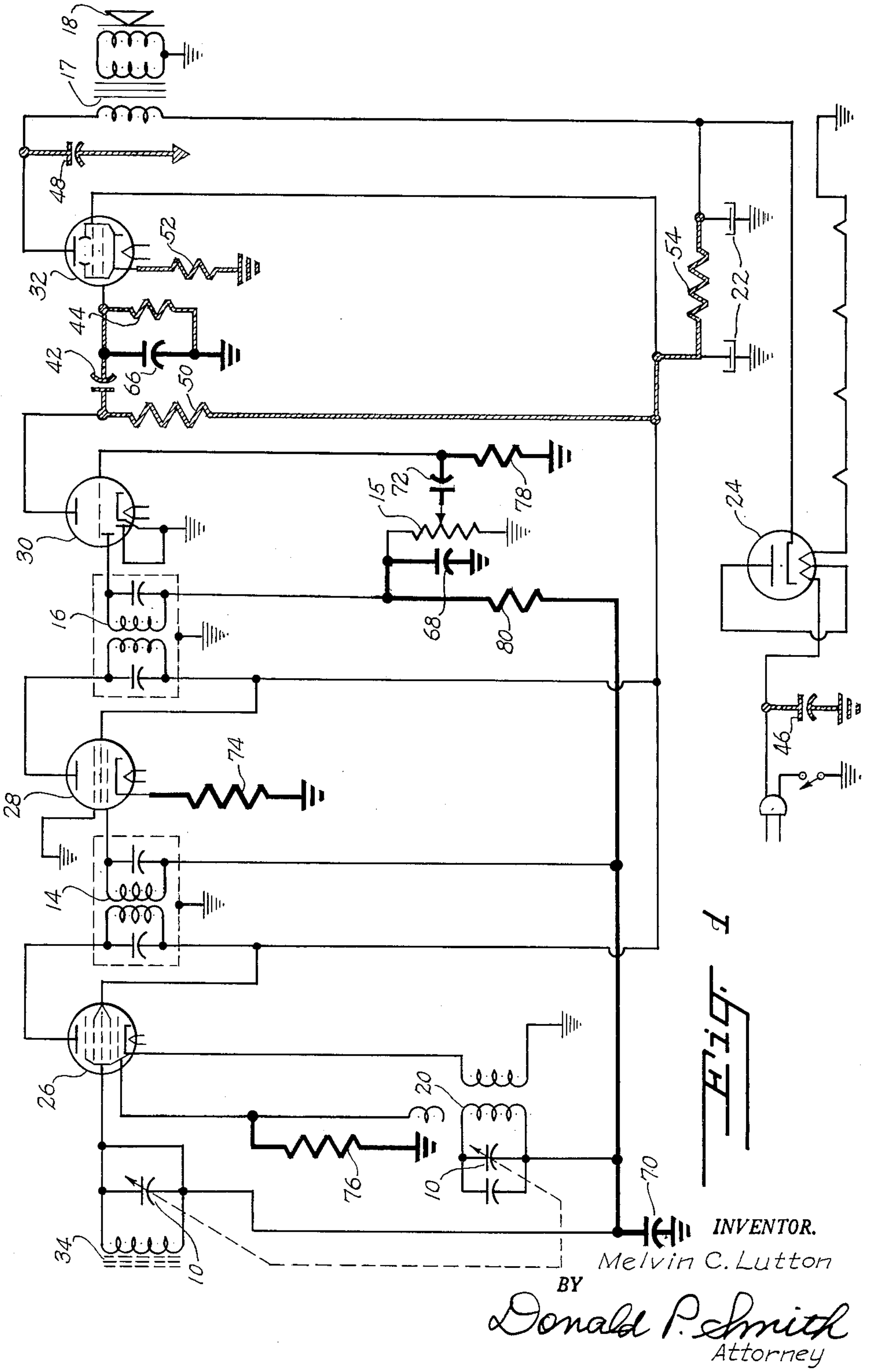
Figure 1 is a schematic diagram of a receiver constructed in accordance with the present invention.

Referring now to the drawing wherein like reference characters designate like or corresponding parts throughout Figure 1 designates a receiver schematic diagram, the receiver being for purposes merely of illustration of the conventional table model series-filament superheterodyne type now in common use. A chassis may be formed by the usual printed circuit arts and consists of a planar insulating panel 21 (see Fig. 16) having disposed on one side thereof an array of conductive paths extending between desired component locations. Mounted on the other side of the panel is a ganged tuning condenser unit 10, a volume control 15, an intermediate frequency transformer 14, a second intermediate transformer 16, an output transformer 17, a speaker assembly 18, an oscillator coil 20, a ganged filter condenser assembly 22, a rectifier tube 24, a converter tube 26, an intermediate frequency amplifier tube 28, a second detector tube 30, an audio output tube 32, and an input transformer and antenna 34. The rest of the receiver circuitry is disposed in a novel manner as will now be explained, it being understood that the instant radio receiver circuit is selected for purposes of illustration only, the invention being applicable to any circuit once the principles involved are understood.

Figure 16:
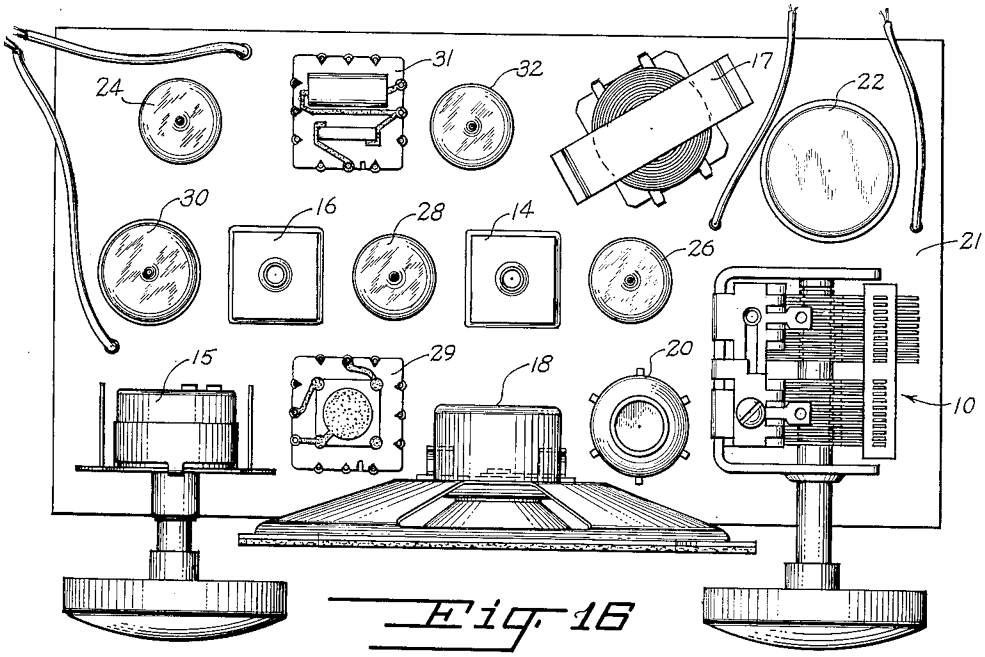

Figures 1 and 16 represent a standard radio receiver design which is used in substantially all of the modern table type superheterodyne receivers. In order for the manufacturer to readily assemble such a circuit with a minimum of expenditure of time, automatic machinery is depended upon to perform many of the assembly operations. In Figure 16 structures 29 and 31 are respectively shown, which will now be described in detail.

Figure 2:
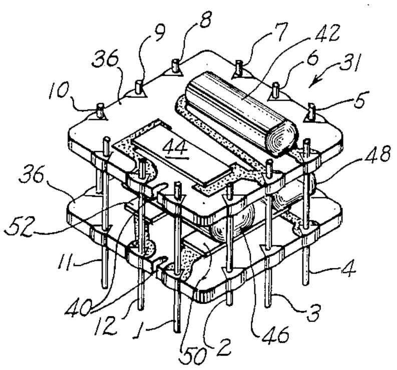
Figure 2 is a perspective view of one of the unitary structures utilized in the embodiment of this invention.
Figure 4:
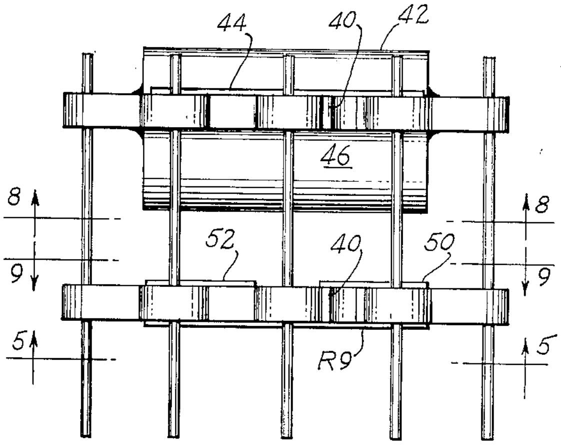
Figure 4 is a view in elevation of the structure of Figure 2.

Figures 2 and 4 taken together illustrate a unitary modular structure comprising a plurality of spaced planar wafers 36 adapted to support electrical components on their surfaces and having an assemblage of conductive risers 1–12 inclusive piercing the same about their peripheries.

The wafers 36 are formed of ceramic or other insulating material whereby an array of metal conductive paths may be deposited on the surfaces to interconnect between component terminals and selective riser wires. The risers are disposed in grooves formed about the periphery of the wafer members and are soldered therein substantially as shown. Orienting notch 40 is formed in each wafer member so that the position of the wafer may be sensed by automatic machinery when the organization is assembled. The above illustrated structure is known as a module and is a unit of considerable versatility in the electrtonic art. It may be used to support a discharge tube and to contain a complete stage of a multi-stage circuit or, as in the instant application, may contain selected components from interrelated stages to thereby facilitate assembly and reduce manufacturing cost. The two modules described herein fulfill the entire R and C requirements of a receiver of this type.

Figure 5:
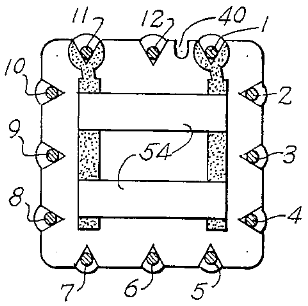
Figure 5 is a view taken on lines 5—5 of Figure 4 and looking in the direction of the arrows.
Figure 8:
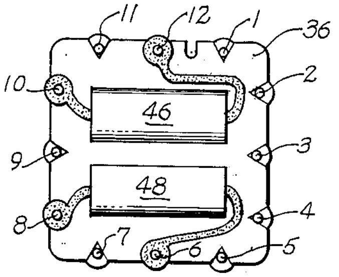
Figure 8 is a view taken on lines 8—8 of Figure 4 and looking in the direction of the arrows.
Figure 9:
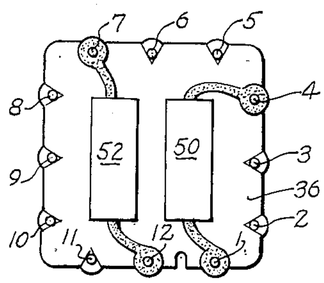
Figure 9 is a view taken on lines 9—9 of Figure 4 and looking in the direction of the arrows.

Referring again to Figures 2 and 4 and considering the schematic diagram of Figure 1 it is seen that the four resistors and three low capacity condensers employed in the audio output and rectifier stages are there assembled. In the diagram of Figure 1 those components carried on the module 31 of Figure 2 are shown by cross-hatching. The audio output grid coupling capacitor 42 is mounted on the top surface of the module and, counting counter clockwise from the orienting groove 40 is connected by conductive paths between risers 3 and 4. The condensers of this type are spirally wound from a sandwiched arrangement of flexible insulating tape with aluminum strips between them and the terminals are brought out at the ends. The audio output grid resistor 44 is mounted on the same surface and connected by metal paths between risers 3 and 12 substantially as there shown. On the undersurface of the ceramic wafer 36 (Figure 8) are carried two condensers, namely, line bypass capacitor 46 connected between risers 10 and 12 and audio plate bypass capacitor 48 connected between risers 6 and 8. On the upper surface of the second insulating member or ceramic wafer 36 (Figure 9) two resistors are mounted, namely, the first audio plate load resistor 50 connected between risers 1 and 4, and audio output cathode bias resistor 52 connected between risers 7 and 12. On the lower surface of the second member or ceramic wafer 36 (Figure 5) is carried the D.C. supply filter resistor 54 connected between risers 1 and 11. In this case, in order to get the proper wattage dissipation it was necessary to parallel two individual tape resistors substantially as there shown. Thus the module of Figures 2 and 4 carries the resistors and capacitors employed in the audio output and rectifier stages.

Figure 3:
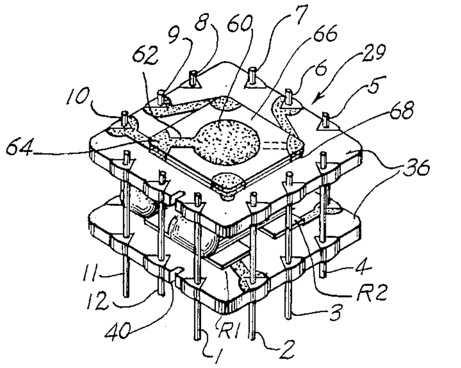
Figure 3 is a perspective view of another of the unitary structures utilized in this invention.
Figure 7:
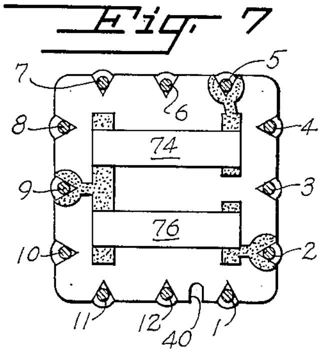
Figure 7 is a view taken on lines 7—7 of Figure 6 and looking in the direction of the arrows.
Figure 6:
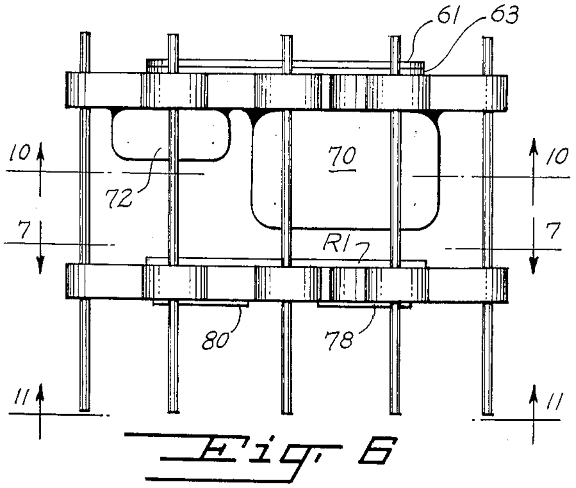
Figure 6 is a view in elevation of the structure of Figure 3.
Figure 10:
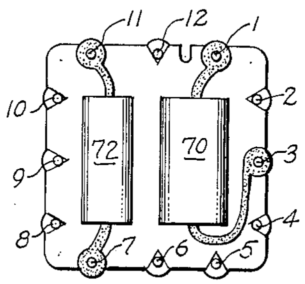
Figure 10 is a view taken on lines 10—10 of Figure 6 and looking in the direction of the arrows.

The module 29 illustrated in Figures 3 and 6 carries the four resistors and four capacitors employed in the converter, intermediate frequency, and detector-AVC stages. As will be seen by reference to Figure 1 the components there illustrated in bold lines are now to be considered. On the upper surfaces of the top ceramic wafer or insulating member 36 two condensers of the type shown in the application of Charles C. Rayburn et al. Serial Number 457,705 filed on September 22, 1954, now Patent Number 2,903,634 are mounted. Condensers of this type consist of thin ceramic plates on which are films of conductive material whereby to provide a stacked capacitor group with an arrangement of electrode areas and terminals with conductive strips joining the electrode areas with the terminals. Electrode area 60 comprises a circular deposit of metal having a conductive path 62 to connect it to a corner terminal 64. An electrode area appears on the other side of the ceramic plate in register therewith and when the two identical discs are stacked as shown, the result is an interconnection of two condensers with a common terminal connected to riser 9. The other terminals having conductive paths connecting them to risers 6 and 10 respectively. The condenser in the upper position, reference character 66, is the RF bypass and functions to remove any radio frequency that may have passed through the amplifier tube 30. If this condenser were not present the receiver would probably oscillate or be unstable due to the output audio stage amplifying a small amount of radio frequency present on the grid of the amplifier tube 30. The lower condenser 68 is the radio frequency bypass condenser shown connected in Figure 1 between a terminal of the volume control and ground. On the lower surface of the top ceramic wafer or insulating member 36 (Figures 6 and 10) is RF bypass 70 which also serves as an AVC filter capacitor. This capacitor is connected between risers 1 and 3. Capacitor 72 serving as the audio grid coupling capacitor is shown connected between risers 11 and 7. On the top of the lower ceramic wafer or insulating member 36 (Figure 7) are carried two resistors. Resistor 74 is the intermediate frequency cathode bias resistor and is connected between risers 5 and 9. Resistor 76 is the oscillator grid leak and is connected between risers 2 and 9.

Figure 11:
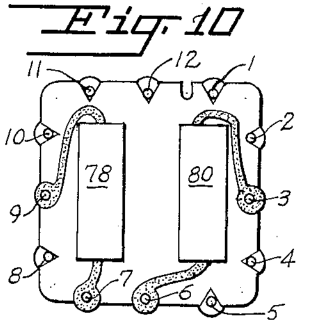
Figure 11 is a view taken on lines 11—11 of Figure 6 and looking in the direction of the arrows.

The bottom surface of the second wafer (Figure 11) carries two resistors. Reference character 78 indicates the detector grid leak resistor connected between riser wires 7 and 9, and 80 designates the AVC isolator resistor connected between risers 3 and 6.

Figure 12:
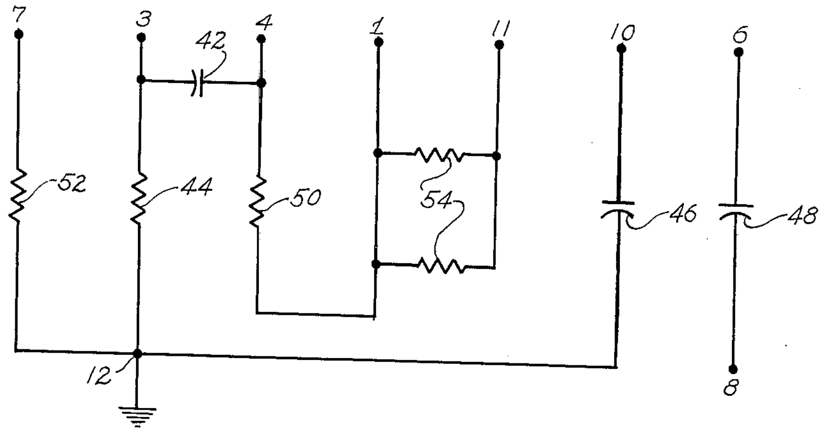
Figure 12 is a schematic diagram of the electrical structure of the electrical components of the structure of Figure 2.
Figure 13:
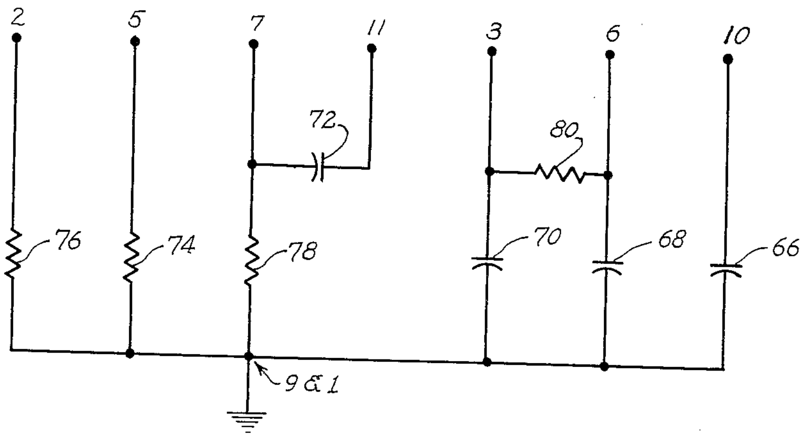
Figure 13 is a schematic wiring diagram showing the connections of the components of the structure of Figure 3.

Figure 12 illustrates the schematic arrangement of the module 31 and it will there be seen that the wire terminals are the ends of the riser wires adapted to be passed through apertures formed in the beforementioned printed circuit panel to be connected into the arrangement of conductive paths. Figure 13 similarly discloses the schematic wiring of module 29, again the terminals represent the risers for connection into the receiver circuit panel. It should be here noted that risers 1 and 9 in this module are connected together to form a single path.

Figure 14:
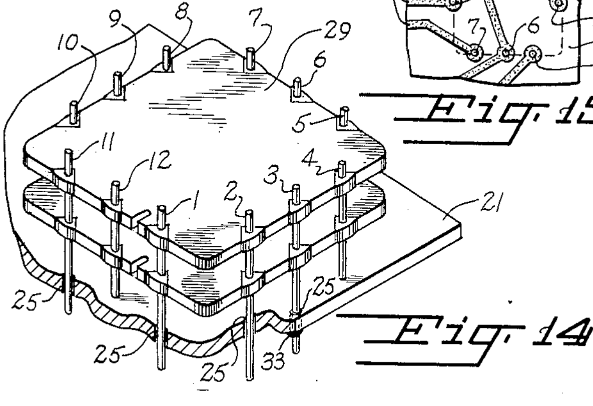
Figure 14 is a fragmentary perspective view of the structure of Figure 3 showing the method of mounting.

Figure 14 is representative of the mounting process and shows how module 29 is fixed in place on the panel 21 of the receiver herein described. Three risers, namely 4, 8 and 12, are broken off to a length shorter than the remaining nine risers and small apertures 25 are formed in the panel to receive the risers in penetrating relationship. The three shortened risers abut against the panel and define a plane to hold the lower wafer spaced from the panel as shown. When the risers have been passed through their respective holes they extend a short distance from the plane of the panel and will be affixed to enlarged areas formed in the panel conductive paths as by solder 33 or other metallic alloy.

Figure 15:
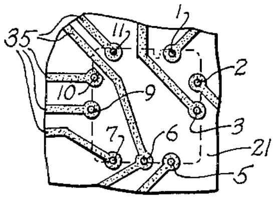
Figure 15 is a bottom plan view of the structure of Figure 3 looking upward at the mounting plate, and, Figure 16 is a top plan view of a typical radio receiver embodying the invention.

Figure 15 is a drawing of the bottom of the circuit panel looking at the section penetrated by the riser wires. The conductive paths, reference character 35, are arranged during fabrication of the printed panel to end in enlarged areas at predetermined positions where selected riser wires penetrate the panel, the risers in turn connect with selected component terminals to join such components into the respective circuit stages.

Thus a receiver circuit is revealed which permits fabrication by automatic machinery and still allows circuit changes without undue disturbance to an assembly line. The several modules illustrated here lend themselves well to automation and machinery is available to fabricate them at a high rate of speed and low cost per unit. The R and C requirements, then, of an electronic circuit can be satisfied by the installation of a few unitary structures in much the same way that a tube socket is installed, thereby eliminating the necessity for a large number of individual mountings of resistors and capacitors. Obviously a single module using four wafers may be used to replace the two units here shown and the invention may be employed in various other circuit types.

It is understood that various modifications within the spirit of the invention may occur to those skilled in the art. Therefore, it is intended that no limitations be placed on the invention other than as defined by the scope of the appended claims.

What is claimed is:

1. An electrical circuit device comprising a panel having a plurality of apertures through one surface thereof, a modular structure including a planar wafer of insulating material and a plurality of spaced riser wires fixed to the periphery of said wafer and substantially normal to the plane of said wafer, a circuit component mounted on said wafer, and means electrically connecting said circuit component to two of said plurality of riser wires, each one of said two riser wires having an end threaded through a different one of said panel apertures and fixed to said panel, a third one of said riser wires having an end adjacent to and shorter than said two riser wire ends, said third riser wire end abutting said panel surface to space said wafer from said panel surface.

2. An electrical circuit device comprising a panel, a plurality of apertures through one surface of said panel, a modular structure including a planar wafer of insulating material, a plurality of spaced riser wires fixed to the periphery of said wafer and substantially normal to the plane of said wafer, a circuit component mounted on said wafer, means electrically connecting said circuit component to two of said plurality of riser wires, each one of said two riser wires having an end threaded through a different one of said panel apertures and fixed to said panel, a third one of said riser wires having an end adjacent to and shorter than said two riser wire ends, said third riser wire end abutting said panel surface to space said wafer from said panel surface, and circuit conductor means on said panel connected to said two riser wires.

3. An electrical circuit device comprising a panel, a plurality of apertures through one surface of said panel, a modular structure including a plurality of planar wafers of insulating material, a plurality of spaced riser wires fixed to the peripheries of said wafers and spacing said wafers from each other in a stacked alignment, said riser wires being positioned substantially normal to the planes of said wafers, a circuit component mounted on each one of said wafers, means electrically connecting said circuit components to certain ones of said plurality of riser wires, each of said certain ones of said riser wires having an end threaded through a different one of said panel apertures and fixed to said panel, another one of said riser wires having an end adjacent to and shorter than said certain riser wire ends and abutting said panel surface to space all of said wafers from said panel surface.

4. An electrical circuit device comprising a panel, a plurality of apertures through one surface of said panel, a modular structure including a plurality of planar wafers of insulating material, a plurality of spaced riser wires fixed to the peripheries of said wafers and spacing said wafers from each other in a stacked alignment, said riser wires being positioned substantially normal to the planes of said wafers, a circuit component mounted on each one of said wafers, means electrically connecting said circuit components to certain ones of said plurality of riser wires, each one of said certain ones of said riser wires having an end threaded through a different one of said panel apertures and fixed to said panel, other ones of said riser wires each having an end adjacent to and shorter than said certain riser wire ends and abutting said panel surface to space all of said wafers from said panel surface, and circuit conductor means on said panel connected to said ends of said certain riser wires.

5. An electrical circuit device comprising an insulating flat panel having a plurality of apertures therethrough, a plurality of strips of conductive material coating portions of one surface of said panel, a modular structure including a planar wafer of insulating material and a plurality of spaced riser wires fixed to the periphery of said wafer and substantially normal to the plane of said wafer, a circuit component mounted on said wafer, means electrically connecting said circuit component to two of said plurality of riser wires, each one of said two riser wires having an end threaded through a different one of said panel apertures and fixed to a different one of said conductive strips, a third one of said riser wires having an end adjacent to and shorter than said two riser wire ends, said third riser wire end abutting said panel to space said wafer from said panel.

6. An electrical circuit device comprising an insulating panel having a plurality of apertures therethrough, a plurality of strips of conductive material coating portions of one surface of said panel, a modular structure including a plurality of planar wafers of insulating material, means mounting said modular structure on the other surface of said panel, said mounting means including a plurality of spaced riser wires fixed to the peripheries of said wafers and spacing said wafers from each other in a stacked alignment, said riser wires being positioned substantially normal to the planes of said wafers, circuit components mounted on at least one said wafers, means electrically connecting said circuit components to certain ones of said plurality of spaced riser wires, each one of said certain ones of said spaced riser wires having an end threaded through a different one of said panel apertures from said other panel surface and fixed to one of said strips of conductive material, other ones of said riser wires each having an end adjacent to and shorter than said certain riser wire ends and abutting said other panel surface to space said wafer from said other panel surface.

References Cited in the file of this patent

UNITED STATES PATENTS

| | | |
|---|---|---|
| 2,066,511 | Arlt | Jan. 5, 1937 |
| 2,774,014 | Henry | Dec. 11, 1956 |

FOREIGN PATENTS

| | | |
|---|---|---|
| 507,108 | Great Britain | June 9, 1939 |

OTHER REFERENCES

Science News Letter, Oct. 3, 1953, vol. 64, No. 14, "Robot Electronic System," page 211.

Tele-Tech, Nov. 1953, vol. 12, No. 11, "Project 'Tinkertoy,' Step Toward the Automatic Factory," pgs. 70–72, 132, 134, 136.

Radio Electronic Engineering, Dec. 1953, "Modular Design of Electronics," pgs. 12, 13, 30.

Amphenol Engineering News, Jan. 1956, "The Modular Concept," pgs. 325, 326.